(12) United States Patent
Munshi

(10) Patent No.: US 7,791,612 B2
(45) Date of Patent: Sep. 7, 2010

(54) FULLY ASSOCIATIVE TEXTURE CACHE HAVING CONTENT ADDRESSABLE MEMORY AND METHOD FOR USE THEREOF

(75) Inventor: Aaftab Munshi, Los Gatos, CA (US)

(73) Assignee: Micron Technology, Inc., Boise, ID (US)

( * ) Notice: Subject to any disclaimer, the term of this patent is extended or adjusted under 35 U.S.C. 154(b) by 664 days.

(21) Appl. No.: 10/931,375

(22) Filed: Aug. 31, 2004

(65) Prior Publication Data

US 2005/0024370 A1 Feb. 3, 2005

Related U.S. Application Data

(63) Continuation of application No. 09/684,168, filed on Oct. 5, 2000, now Pat. No. 6,784,892.

(51) Int. Cl.
*G06T 11/40* (2006.01)
*G06F 12/06* (2006.01)
*G09G 5/36* (2006.01)

(52) U.S. Cl. .................. 345/552; 345/572; 345/558

(58) Field of Classification Search ................ 345/557, 345/558, 552, 530, 564, 566, 568, 572
See application file for complete search history.

(56) References Cited

U.S. PATENT DOCUMENTS

| | | | | |
|---|---|---|---|---|
| 4,785,398 A | 11/1988 | Joyce et al. | ........... | 364/200 |
| 5,574,875 A | 11/1996 | Stansfield et al. | ........... | 395/403 |
| 5,668,972 A | 9/1997 | Liu et al. | ........... | 711/136 |
| 5,798,767 A | 8/1998 | Poole et al. | ........... | 345/431 |
| 5,805,855 A * | 9/1998 | Liu | ........... | 711/108 |
| 5,850,208 A | 12/1998 | Poole et al. | ........... | 345/153 |
| 5,860,146 A * | 1/1999 | Vishin et al. | ........... | 711/207 |
| 5,987,567 A * | 11/1999 | Rivard et al. | ........... | 345/552 |
| 6,052,757 A * | 4/2000 | Pedicone et al. | ........... | 711/108 |
| 6,157,987 A | 12/2000 | Krishnamurthy et al. | ........... | 711/129 |
| 6,215,497 B1 | 4/2001 | Leung | ........... | 345/419 |
| 6,353,874 B1 | 3/2002 | Morein | ........... | 711/118 |
| 6,426,753 B1 | 7/2002 | Migdal | ........... | 345/506 |
| 6,560,674 B1 | 5/2003 | Hosogi et al. | ........... | 711/118 |
| 6,587,113 B1 * | 7/2003 | Baldwin et al. | ........... | 345/557 |
| 6,734,867 B1 * | 5/2004 | Munshi et al. | ........... | 345/557 |

* cited by examiner

*Primary Examiner*—Joni Hsu
(74) *Attorney, Agent, or Firm*—Dorsey & Whitney LLP

(57) ABSTRACT

A graphics processing system including a cache memory circuit coupled to the graphics processor and the address and data busses for storing graphics data according to a respective address. The cache memory includes first and second memories coupled together by a plurality of activation lines. The first memory has a corresponding plurality of address detection units to store addresses and provide activation signals in response to receiving a matching address. The second memory includes a corresponding plurality of data storage locations. Each data storage location is coupled to a respective one of the plurality of address storage locations by a respective activation line to provide graphics data in response to receiving an activation signal from the respective address storage location.

14 Claims, 3 Drawing Sheets

FULLY ASSOCIATIVE TEXTURE CACHE HAVING CONTENT ADDRESSABLE MEMORY AND METHOD FOR USE THEREOF

CROSS-REFERENCE TO RELATED APPLICATION

This application is a continuation of pending U.S. patent application Ser. No. 09/684,168, filed Oct. 5, 2000.

TECHNICAL FIELD

The present invention is related generally to the field of computer graphics, and more particularly, to caching graphics information in a computer graphics processing system.

BACKGROUND OF THE INVENTION

A graphics accelerator is a specialized graphics processing subsystem for a computer system that relieves a host processor from performing all the graphics processing involved in rendering a graphics image on a display device. The host processor of the computer system executes an application program that generates geometry information used to define graphics elements on the display device. The graphics elements that are displayed are typically modeled from polygon graphics primitives. For example, a triangle is a commonly used polygon for rendering three dimensional objects on the display device. Setup calculations are initially performed by the host processor to define the triangle primitives. The application program then transfers the geometry information from the processor to the graphics processing system so that the triangles may be modified by adding shading, hazing, or other features before being displayed. The graphics processing system, as opposed to the processor, has the task of rendering the corresponding graphics elements on the display device to allow the processor to handle other system requests.

Some polygon graphics primitives also include specifications to map texture data, representative of graphic images, within the polygons. Texture mapping refers to techniques for adding surface detail, or a texture map, to areas or surfaces of the polygons displayed on the display device. A typical texture map includes point elements ("texels") which reside in a (s, t) texture coordinate space. The graphics data representing the texels of a texture map are stored in a memory of the computer system and used to generate the color values of point elements ("pixels") of the display device which reside in an (x, y) display coordinate space. Where the original graphics primitives are three dimensional, texture mapping often involves maintaining certain perspective attributes with respect to the surface detail added to the graphics primitive, a texture image is represented in the computer memory as a bitmap or other raster-based encoded format.

Generally, the process of texture mapping occurs by accessing the texels from the memory that stores the texture data, and transferring the texture map texels to predetermined points of the graphics primitive being texture mapped. The (s, t) coordinates for the individual texels are calculated and then converted to memory addresses. The texture map data are read out of memory and applied within the respective polygon in particular fashions depending on the placement and perspective of their associated polygon. The process of texture mapping operates by applying color or visual attributes of texels of the (s, t) texture map to corresponding pixels of the graphics primitive on the display. Thus, color values for pixels in (x, y) display coordinate space are determined based on sampled texture map values. After texture mapping, a version of the texture image is visible on surfaces of the graphics primitive, with the proper perspective, if any.

The process of texture mapping requires a great demand on the memory capacity of the computer graphics processing system because a lot of texture maps are accessed from memory during a typical display screen update cycle. Since the frequency of the screen update cycles is rapid, the individual polygons of the screen (and related texture map data per polygon) need to be accessed and updated at an extremely rapid frequency requiring great data throughput capacities. In view of the above memory demands, high performance graphics hardware units often integrate a graphics processor and a low access time cache memory unit onto a common substrate for storing and retrieving blocks of texture data at high speeds.

A tag cache, typically implemented by using a random access memory (RAM), stores a "tag" for each data block stored in a data cache. The tag is usually the memory address, or a portion thereof, corresponding the location in the host memory where the data is stored. In a fully associative cache, that is, a cache where data may be stored in any of the data storage locations of the data cache, the address of the requested data must be compared with each of the tags stored in the tag cache. With texture caches, as a texture-mapped polygon is processed a cache controller must check each address present in the tag cache to determine whether a requested block of texture data is stored in the texture cache. If the requested texture data is present in the data cache, it is immediately provided for texture application to the polygon. However, if the requested memory address is not present in the texture cache, the cache controller unit must first obtain the desired block of texture data from memory. The data and tag caches are updated with the retrieved data and corresponding memory address, respectively, prior to being provided for texture application.

Although cache memory units improve the speed at which data may be provided for processing, implementing a cache memory unit with a tag RAM often requires complex circuitry to examine all of the addresses of the texture data present in the texture cache. This is especially the case for a fully associative cache. The complexity of the circuitry results in increased access times and may require a substantial portion of the substrate for their layout. Therefore, it can be appreciated that there is a need for a texture cache having reduced complexity and that can provide texture mapped data at high speeds.

SUMMARY OF THE INVENTION

One aspect of the present invention is directed to a method in a graphics processing system for reading data representing texels of a texture map. The method includes comparing at least a portion of a memory address to a plurality of tag values stored in a corresponding plurality of tag locations of a content addressable memory (CAM). In response to the portion of the memory address matching one of the stored tag values, an active match signal identifying a buffer location in a memory buffer is generated that is associated with the tag location storing the matching tag value. In response to the active match signal, the associated buffer location in the memory buffer is accessed, data stored in the associated buffer location is retrieved, and the data retrieved from the buffer location is provided as data representing the requested texel.

DETAILED DESCRIPTION OF THE INVENTION

Figure 1:
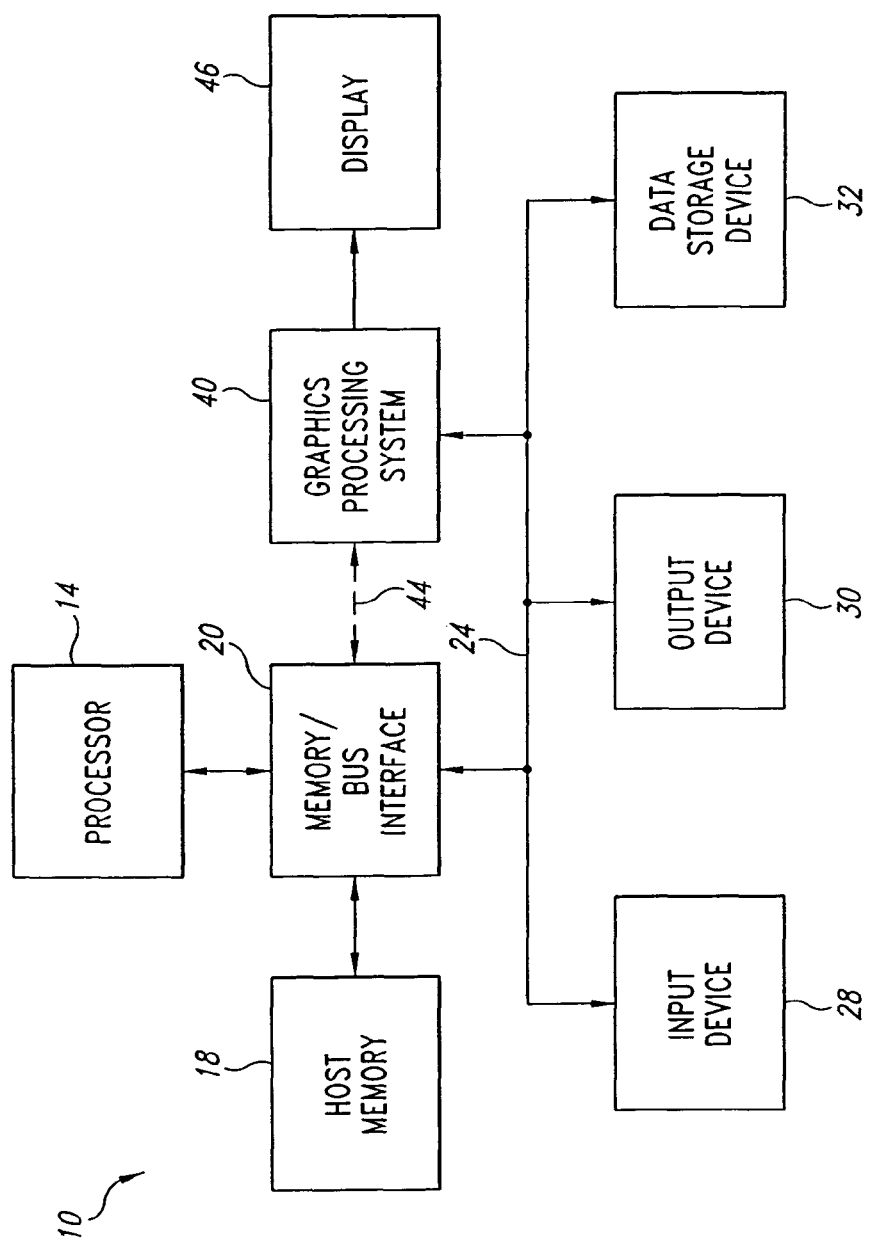
FIG. 1 is a block diagram of a computer system in which an embodiment of the present invention is implemented.

Embodiments of the present invention provide a fully associative cache configuration for a texture cache in a graphics processing system. FIG. 1 illustrates a computer system 10 in which embodiments of the present invention are implemented. The computer system 10 includes a processor 14 coupled to a host memory 18 by a memory/bus interface 20. The memory/bus interface 20 is also coupled to an expansion bus 24, such as an industry standard architecture (ISA) bus or a peripheral component interconnect (PCI) bus. The computer system 10 also includes one or more input devices 28, such as a keypad or a mouse, coupled to the processor 14 through the expansion bus 24 and the memory/bus interface 20. The input devices 28 allow an operator or an electronic device to input data to the computer system 10. One or more output devices 30 are coupled to the processor 14 to provide output data generated by the processor 14. The output devices 30 are coupled to the processor 14 through the expansion bus 24 and memory/bus interface 20. Examples of output devices 30 include printers and a sound card driving audio speakers. One or more data storage devices 32 are coupled to the processor 14 through the memory/bus bridge interface 20, and the expansion bus 24 to store data in or retrieve data from storage media (not shown). Examples of storage devices 32 and storage media include fixed disk drives, floppy disk drives, tape cassettes and compact-disk read-only memory drives.

The computer system 10 further includes a graphics processing system 40 coupled to the processor 14 through the expansion bus 24 and memory/bus interface 20. Embodiments of the present invention are implemented within the graphics processing system 40. Optionally, the graphics processing system 40 may be coupled to the processor 14 and the host memory 18 through other architectures. For example, the graphics processing system 40 may be coupled through the memory/bus interface 20 and a high speed bus 44, such as an accelerated graphics port (AGP), to provide the graphics processing system 40 with direct memory access (DMA) to the host memory 18. That is, the high speed bus 44 and memory bus interface 20 allow the graphics processing system 40 to read and write host memory 18 without the intervention of the processor 14. Thus, data may be transferred to, and from, the host memory 18 at transfer rates much greater than over the expansion bus 24. A display 46 is coupled to the graphics processing system 40 to display graphics images, and may be any type, such as a cathode ray tube (CRT) for desktop, workstation or server application, or a field emission display (FED), liquid crystal display (LCD), or the like, which are commonly used for portable computer.

Figure 2:
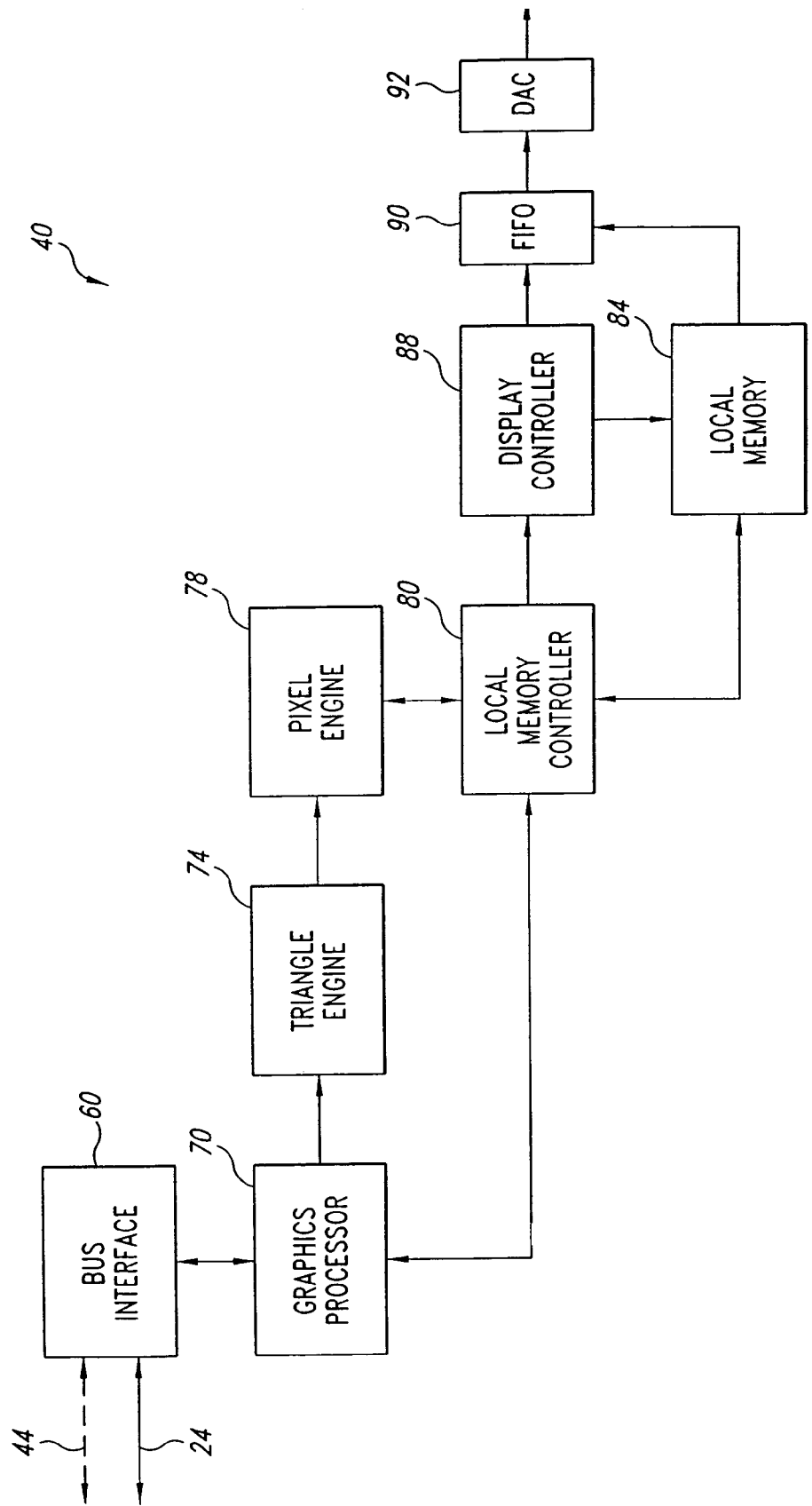
FIG. 2 is a block diagram of a graphics processing system in the computer system of FIG. 1.

FIG. 2 illustrates circuitry included within the graphics processing system 40, including circuitry for performing various three-dimensional (3D) graphics function. As shown in FIG. 4, a bus interface 60 couples the graphics processing system 40 to the expansion bus 24. Where the graphics processing system 40 is coupled to the processor 14 and the host memory 18 through the high speed data bus 44 and the memory/bus interface 20, the bus interface 60 will include a DMA controller (not shown) to coordinate transfer of data to and from the host memory 18 and the processor 14. A graphics processor 70 is coupled to the bus interface 60 and is designed to perform various graphics and video processing functions, such as, but not limited to, vertex transformations. In the preferred embodiment, the graphics processor 70 is a reduced instruction set computing (RISC) processor. Data generated by the graphics processor 70 is provided to a triangle engine 74. The triangle engine 74 contains circuitry for performing various graphics functions, such as clipping, attribute transformations, rendering of graphics primitives, and generating texture coordinates (s, t) from a texture map.

A pixel engine 78 is coupled to receive the graphics data generated by the triangle engine 74. The pixel engine 78 contains circuitry for performing various graphics functions, such as, but not limited to, texture application, bilinear filtering, fog, blending, color space conversion, and dithering. A memory controller 80 coupled to the pixel engine 78 and the graphics processor 70 handles memory requests to and from the host memory 18, and a local memory 84. The local memory 84 stores graphics data, such as texture data, in the compressed format provided by the data compression circuit 76 and the graphics processor 70, and additionally stores both source pixel color values and destination pixel color values. Destination color values are stored in a frame buffer (not shown) within the local memory 84. In a preferred embodiment, the local memory 84 is implemented using random access memory (RAM), such as dynamic random access memory (DRAM), or static random access memory (SRAM). A display controller 88 coupled to the local memory 84 and to a first-in first-out (FIFO) buffer 90 controls the transfer of destination color values stored in the frame buffer to the FIFO 90. Destination values stored in the FIFO 90 are provided to a digital-to-analog converter (DAC) 92, which outputs red, green, and blue analog color signals to the display 46 (FIG. 1).

Figure 3:
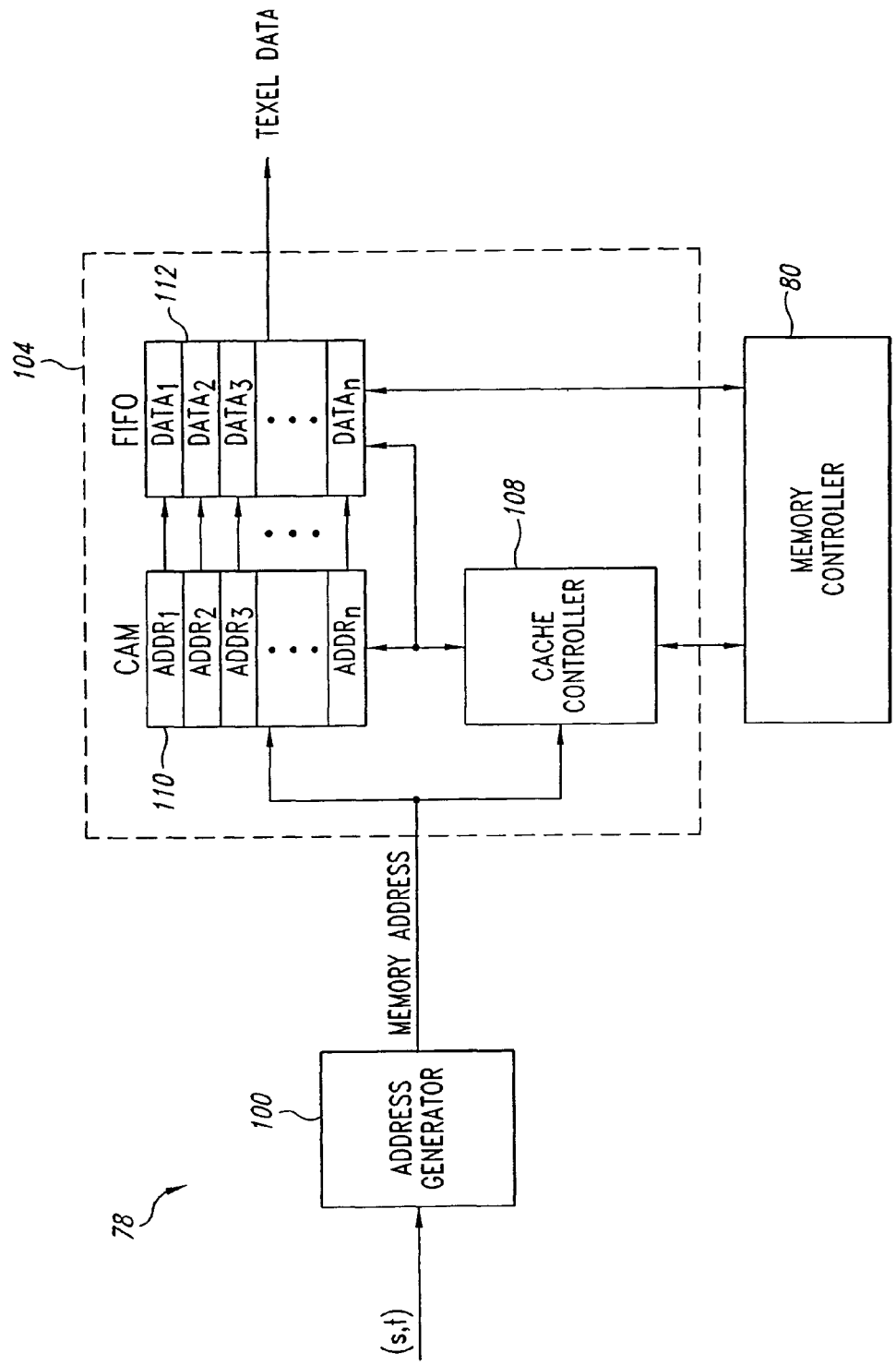
FIG. 3 is a block diagram of circuitry from a pixel engine in the graphics processing system of FIG. 2.

FIG. 3 illustrates circuitry included within the pixel engine 78, including circuitry for providing texture map data used in texture application functions. An address generator 100 receives the texture map coordinates (s, t) from the triangle engine and converts them to texel addresses corresponding to where the data representing the respective texels are stored in memory. A texture cache 104 coupled to the address generator 100 receives the texel addresses and determines whether the referenced texel address is present in the texture cache 104. The texture cache 104 includes a cache controller 108 receiving the texel address from the address generator 100, and a content addressable memory (CAM) 110 coupled to a FIFO buffer 112 through a number of activation lines. The CAM 110 and FIFO buffer 112 may be of a conventional design well known to those of ordinary skill in the art. Each address storage location of the CAM 110 is coupled through a respective activation line to a corresponding data storage location in the FIFO 112. The cache controller 108 and the FIFO 112 are also coupled to the memory controller 80 to request data to be transferred between the FIFO 112 and either the local memory 84 or the host memory 18.

As mentioned previously, each texel address generated by the address generator 100 is checked to determine whether the texel address of the requested block of texture data is present in the CAM 110. If present, then there is a cache "hit." The activation line corresponding to the entry in the CAM 110 matching the texel address becomes active, causing the corresponding data block of the FIFO 112 to output its texture data. The texture data is provided to the next graphics processing stage in the pixel engine pipeline. As mentioned previously, the pixel engine performs additional graphics functions on the data provided by the texture cache. A more detailed description of these specific graphics functions has been omitted in the interests of brevity, and may be found in U.S. Pat. Nos. 5,798,767 and 5,850,208 to Poole et al., issued Aug. 25, 1998 and Dec. 15, 1998, respectively, which are incorporated herein by reference.

In the case where the texel address provided by the address generator 100 is not present in the CAM 110, there is a cache "miss," and the texture data associated with the texel address must be fetched from either the local memory 84 or the host memory 18. A data request is made by the cache controller 108 to the memory controller 80 to obtain the texture data, and a data block in the FIFO 112 is cleared for the receipt of the new texture data according to the first-in-first-out rule. If the requested texture data is not present in the local memory 84, then a request is made to retrieve the texture data from the host memory 18. Obtaining the texture data from memory is handled by the memory controller 80 and the graphics processor 70. When the texture data is returned by the memory controller 80, the cache controller 110 causes the new texture data to be written into the recently cleared data block in the FIFO 112, and the corresponding texel address to be entered into the CAM 110. The texture data is then provided to the next processing stage in the pixel engine pipeline.

The cache configuration illustrated in FIG. 3 provides a fully associative cache for texture data. That is, the texture data may be stored in any of the data storage locations of the FIFO 112. Consequently, the addresses provided to the texture cache 104 must be checked against each of the addresses of the texture data present in the CAM 110. Checking the texel addresses provided by the address generator 100 against each address of the texture data present in the FIFO 112 is facilitated by the CAM 110.

It will be appreciated that the cache configuration illustrated in FIG. 3 may be implemented for a variety of cache sizes. The cache size of the texture cache 104 will depend several considerations that are understood by those of ordinary skill in the art.

From the foregoing it will be appreciated that, although specific embodiments of the invention have been described herein for purposes of illustration, various modifications may be made without deviating from the spirit and scope of the invention. For example, the texture cache 104 has been described as including the FIFO 112 to store the texture data, however, a buffer implementing a LRU replacement algorithm could be substituted for the FIFO 112. Accordingly, the invention is not limited except as by the appended claims.

The invention claimed is:

1. A method for reading data representing texels of a texture map in a graphics processing system, the method comprising:
    receiving a texel coordinate for a requested texel;
    translating the texel coordinate to a memory address at which the data representing the requested texel is stored in a system memory of a system in which the graphics processing system is located;
    comparing at least a portion of the memory address to a plurality of tag values stored in a corresponding plurality of tag locations of a content addressable memory (CAM), each tag location associated with a corresponding buffer location;
    in response to the portion of the memory address matching one of the stored tag values,
        generating at the CAM one active match signal identifying a buffer location in a memory buffer that corresponds to the tag location storing the matching tag value;
        in response to the active match signal, accessing the corresponding buffer location in the memory buffer;
        retrieving data stored in the corresponding buffer location; and
        providing the data retrieved from the corresponding location as data representing the requested texel; and
    in response to the portion of the memory address not matching one of the tag values,
        retrieving the data for the requested texel from the memory;
        storing the data in a buffer location in the memory buffer;
        storing a tag value associated with the memory address in the content addressable memory, the value stored in a tag location corresponding to the buffer location in the memory buffer at which the data is stored; and
        providing the data retrieved from the memory as data representing the requested texel.

2. The method of claim 1 wherein generating an active match signal identifying a buffer location in a memory buffer that corresponds to the tag location storing the matching tag value comprises generating an active match signal identifying a buffer location in a memory buffer arranged in a first-in-first-out (FIFO) manner.

3. The method of claim 1, further comprises clearing the buffer location in the memory buffer prior to storing retrieved data and clearing the corresponding tag location in the CAM prior to storing the tag value in response to the portion of the memory address not matching one of the tag values.

4. The method of claim 3 wherein clearing the buffer location in the memory buffer comprises clearing the buffer location storing the least-recently-used data.

5. The method of claim 1 wherein storing the data in a buffer location in the memory buffer in response to the portion of the memory address not matching one of the tag values comprises storing the data in any of the buffer locations in the memory buffer.

6. A method of storing data representing texels of a texture map in a graphics processing system, the method comprising:
    storing data representing texels of at least one texture map in a buffer, the buffer having a plurality of buffer locations in which respective data are stored;
    for each data stored in a respective buffer location in the buffer, storing a value in a content addressable memory (CAM) coupled to the buffer, the value related to a memory address corresponding to a memory location in a memory at which the data are stored, the CAM having a plurality of CAM locations in which a respective value can be stored and each buffer location associated with a fixed respective CAM location;
    comparing a value based on a received memory address to the values stored in the CAM, and in response to determining that the value based on the received memory address matches a stored value generating at the CAM one match signal corresponding to the matching entry;
    in response to comparing a value based on a received memory address to the values stored in the CAM and determining that the value based on the received memory address does not match any of the values,
        retrieving data from a location in a system memory of a system in which the graphics processing system is located corresponding to the received memory address;

storing the retrieved data in a buffer location in the buffer;

storing the value based on the received memory address in the fixed respective CAM location associated with the buffer location in which the retrieved data is stored.

7. The method of claim 6 wherein comparing a value based on a received memory address to the values stored in the CAM comprises comparing a portion of the received memory address to the values stored in the CAM.

8. The method of claim 6 wherein comparing a value based on a received memory address to the values stored in the CAM comprises comparing a value calculated from the received memory address to the values stored in the CAM.

9. The method of claim 6 wherein storing data representing texels of at least one texture map in a buffer comprises storing data representing texels of at least one texture map in a buffer arranged in a first-in-first-out (FIFO) manner.

10. A graphics processing system, comprising:

a bus interface for coupling to a system bus;

a graphics processor coupled to the bus interface and configured to process graphics data;

address and data busses coupled to the graphics processor to transfer address and graphics data to and from the graphics processor; and a cache memory coupled to the graphics processor and the address and data busses, the cache memory configured to store data representing texels of at least one texture map, the cache memory including a content addressable memory (CAM) and a buffer coupled to the CAM, the buffer having a plurality of data storage locations configured to store respective data and the CAM having a plurality of tag locations configured to store a respective tag value identifying the data stored in an associated data storage location, each tag location associated with the same respective data storage location, in response to receiving a value based on a memory address corresponding to a memory location at which requested data is stored that matches a tag value, the CAM configured to generate one active match signal identifying the associated data storage location in the buffer to retrieve the data stored therein;

local memory coupled to the cache memory and the graphics processor, the local memory configured to store the data representing texels of at least one texture map at memory locations corresponding to memory addresses; and a cache controller coupled to the cache memory configured to retrieve requested data from a memory location in a system memory of a system in which the graphics processing system is located corresponding to the memory address in response to the cache controller receiving a value that does not match a tag value stored in the buffer.

11. The graphics processing system of claim 10 wherein the buffer of the cache memory comprises a first-in-first-out buffer.

12. The graphics processing system of claim 10, further comprising an address generator circuit coupled to the cache memory and the graphics processor, the address generator circuit configured to calculate memory addresses for the data representing texels of a texture map from a texel coordinate of the texture map and provide the calculated addresses to the CAM.

13. The graphics processing system of claim 12 wherein the buffer of the cache memory comprises a random access memory.

14. The graphics processing system of claim 10 wherein the buffer comprises a buffer configured to store requested data retrieved from the memory location in any of the data storage locations and the CAM is configured to store a tag value for the requested data in the associated tag location.

* * * * *

UNITED STATES PATENT AND TRADEMARK OFFICE
CERTIFICATE OF CORRECTION

PATENT NO. : 7,791,612 B2  Page 1 of 1
APPLICATION NO. : 10/931375
DATED : September 7, 2010
INVENTOR(S) : Aaftab Munshi It is certified that error appears in the above-identified patent and that said Letters Patent is hereby corrected as shown below:

In column 1, line 9, after "continuation of" delete "pending".

In column 1, line 10, delete "2000." and insert --2000, now Pat. No. 6,784,892--.

Signed and Sealed this

Seventh Day of December, 2010

David J. Kappos
*Director of the United States Patent and Trademark Office*